(12) United States Patent
Glass et al.

(10) Patent No.: US 7,893,136 B2
(45) Date of Patent: Feb. 22, 2011

(54) WATER SOLUBLE CO-POLYHYDROXYAMINOETHER AND SOLUTION THEREOF

(75) Inventors: Terry W. Glass, Clute, TX (US); William J. Harris, Lake Jackson, TX (US); Jerry E. White, Lake Jackson, TX (US); Mike Cavitt, Lake Jackson, TX (US); David C. Jammer, Sweeny, TX (US); Louis A. Willy, Jr., Cedar Lane, TX (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 12/626,326

(22) Filed: Nov. 25, 2009

(65) Prior Publication Data

US 2010/0113690 A1    May 6, 2010

Related U.S. Application Data

(60) Continuation of application No. 11/924,117, filed on Oct. 25, 2007, now abandoned, which is a division of application No. 10/662,089, filed on Sep. 12, 2003, now abandoned.

(51) Int. Cl.
*C08L 63/00* (2006.01)
*C08L 79/00* (2006.01)
*C08G 65/26* (2006.01)
*C08G 73/00* (2006.01)
*C09K 8/00* (2006.01)

(52) U.S. Cl. .................. 523/417; 523/436; 528/119; 528/120; 528/121; 528/122

(58) Field of Classification Search .................. None
See application file for complete search history.

(56) References Cited

U.S. PATENT DOCUMENTS

| | | | |
|---|---|---|---|
| 3,347,802 A | 10/1967 | Ashby et al. | |
| 5,464,924 A | 11/1995 | Silvis et al. | |
| 5,567,748 A * | 10/1996 | Klein et al. | 523/420 |
| 6,051,670 A | 4/2000 | Ahmed et al. | |
| 6,569,983 B1 | 5/2003 | Treybig et al. | |
| 7,504,438 B1 * | 3/2009 | Treybig et al. | 516/161 |

FOREIGN PATENT DOCUMENTS

WO    WO 03/053536 A1    7/2003

* cited by examiner

*Primary Examiner*—Michael J Feely
(74) *Attorney, Agent, or Firm*—Vedder Price P.C.

(57) ABSTRACT

A water soluble polymer comprising a copolyhydroxyaminoether having side-chains of polyalkylene oxides, an aqueous solution of said polymer and process for preparing the copolyhydroxyaminoether.

9 Claims, No Drawings

WATER SOLUBLE CO-POLYHYDROXYAMINOETHER AND SOLUTION THEREOF

CROSS-REFERENCE TO RELATED APPLICATION

This application is a continuation of application Ser. No. 11/924,117 now abandoned, filed Oct. 25, 2007, which is a divisional of application Ser. No. 10/662,089 now abandoned, filed Sep. 12, 2003, the disclosures of which are incorporated by reference herein in their entirety.

BACKGROUND OF THE INVENTION

This invention relates to water-soluble polymers. Water-soluble polymers are used in many applications ranging from improved oil recovery, metal working fluid lubrication, and gellants in the food industry. It is known that the production of large amounts of water from oil and gas wells constitutes one of the major expenses in the overall recovery of hydrocarbons from a subterranean reservoir and that some water-soluble polymers reduce such water production. See, for example, Treybig et al. U.S. Pat. No. 6,569,983 and Ahmed et al. U.S. Pat. No. 6,051,670.

It is also well known that polymers and gelled or crosslinked water-soluble polymers have been used to alter the permeability of subterranean formations in order to enhance the effectiveness of water flooding operations. Generally, the polymers are injected into the formation and permeate into the regions having the highest water permeability. It is theorized that the polymer blocks the water permeable zones in the formation, thus reducing the amount of water produced with the oil. Existing polymers, such as polyacrylamides, do reduce water production but they also reduce oil production.

It would be desirable to provide water-soluble polymers that reduce water production but does not affect oil production.

SUMMARY OF THE INVENTION

In a first aspect, the present invention is a water-soluble polymer comprising a copolyhydroxyaminoether having side-chains of polyalkylene oxides.

In a second aspect, the present invention is a composition comprising an aqueous fluid and the water-soluble polymer of the first aspect.

In a third aspect, the present invention is a process for preparing the water soluble polymer of the first aspect which comprises reacting (1) a primary amine, a bis(secondary) diamine, or a mono-amine-functionalized poly(alkylene oxide) or mixtures thereof with (2) a diglycidyl ether, a diepoxy-functionalized poly(alkylene oxides) or mixtures thereof under conditions sufficient to cause the amine moieties to react with the epoxy moieties to form a polymer backbone having amine linkages, ether linkages and pendant hydroxyl moieties.

In a fourth aspect, the present invention is a process for preparing the water soluble polymer of the first aspect which comprises reacting an equivalent or excess of a difunctional amine or mixtures thereof with an excess or equivalent amount of a diglycidyl ether of a bisphenol or mixtures thereof, optionally in the presence of a monofunctional nucleophile which functions as a terminating agent and, optionally, in the presence of a catalyst and/or a solvent.

In a fifth aspect, the present invention is a process for preparing the water soluble polymer of the first aspect which comprises dissolving in an organic or non-organic solvent an amine selected from the group consisting of primary amine, a bis(secondary) diamine, or a mono-amine-functionalized poly(alkylene oxide) or mixtures thereof, adding to the amine solution an epoxide selected from the group consisting of a diglycidyl ether, a diepoxy-functionalized poly(alkylene oxides) or mixtures thereof in an amine hydrogen equivalent to epoxide equivalent ratio of from 1.01:1 to 1.1:1 under conditions sufficient to cause the amine moieties to react with the epoxy moieties to form a polymer backbone having amine linkages, ether linkages and pendant hydroxyl moieties.

Other aspects of the present invention will become apparent from the following detailed description and claims.

DETAILED DESCRIPTION OF THE INVENTION

Preferably, the copolyhydroxyaminoether is represented by the formula:

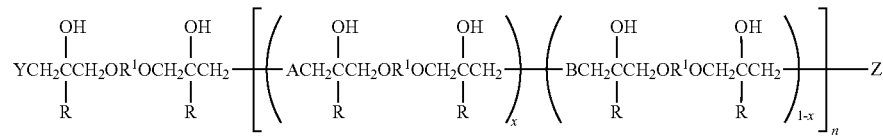

wherein R is hydrogen or $C_1$-$C_{20}$ alkyl; $R^1$ is an aromatic or substituted aromatic moiety; Y is an organic moiety that does not contain an epoxy group and Z is an organic moiety, optionally containing an epoxy group; x is 0-0.99; and n is 5-400; each A is individually an amino group represented by one of the formulas:

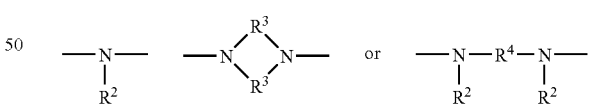

wherein $R^2$ is hydrocarbyl or substituted hydrocarbyl; $R^3$ is $C_2$-$C_{10}$ hydrocarbylene or substituted hydrocarbylene; $R^4$ is $C_2$-$C_{20}$ hydrocarbylene or substituted hydrocarbylene, wherein the substituent(s) is hydroxyl, cyano, halo, arlyloxy, alkylamido, arylamido, alkylcarbonyl, or arylcarbonyl; and each B is represented by the formula:

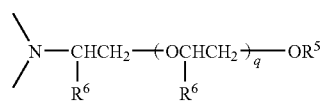

wherein $R^5$ is hydrocarbyl; $R^6$ is hydrogen, methyl, ethyl, hydrocarbyl, or mixtures thereof; and x is 0-0.99 when q is greater than 40; but less than 0.2 or greater than 0.8 when q is less than 40.

For purposes of this invention, the term "hydrocarbyl" means a monovalent hydrocarbon such as alkyl, cycloalkyl, aralkyl, or aryl and the term "hydrocarbylene" means a divalent hydrocarbon such as alkylene, cycloalkylene, aralkylene or arylene.

In the more preferred embodiment of this invention, R is hydrogen; $R^1$ is isopropylidenediphenylene, 1,4-phenylene, 1,3-phenylene, methylenediphenylene, thidodiphenylene, carbonyldiphenylene, or combinations thereof; $R^2$ is methyl, ethyl, phenyl, benzyl, 2-hydroxyethyl, 3-hydroxypropyl, 2-hydroxypropyl, 2,3-dihydroxypropyl, 2-(acetamido)ethyl, or combinations thereof; $R^3$ and $R^4$ are independently ethylene, 1,2-propylene, 1,2-butylene, or combinations thereof; and $R^5$ is $C_1$-$C_{20}$ alkyl.

In the most preferred embodiment of this invention, $R^1$ is isopropylidenediphenylene, $R^2$ is 2-hydroxyethyl; $R^5$ is hydrogen, methyl, ethyl, propyl, butyl, benzyl or combinations thereof; $R^6$ is a mixture of hydrogen and methyl; Y and Z are N-(2-hydroxyethyl)piperazinyl or bis(2-hydroxyethyl) amino, q is 20-50, and n is 10-25.

The water-soluble polymer can be recovered from the reaction mixture by conventional methods. For example, the reaction mixture containing the polymer and optional solvent can be diluted with a suitable solvent such as dimethylformamide, cooled to room temperature, and the polymer isolated by precipitation into a non-solvent. The precipitated polymer can then be purified by washing or multiple washings by the non-solvent. The polymer is collected by filtration, washed with a suitable non-solvent and then dried. The water-soluble polymer can also be recovered from solution by volatilization of the solvent by combination of temperature and vacuum.

The difunctional amines which can be employed in the practice of the present invention include the bis-secondary amines and primary amines.

The primary amines which can be employed in the practice of the present invention to prepare the polymers include aniline and substituted anilines, e.g., 4-(methylamido) aniline, 4-methylaniline, 4-methoxy-aniline, 4-tert-butylaniline, 3,4-dimethoxyaniline, 3,4-dimethylaniline; alkylamines, and substituted alkyl amines, e.g., butylamine and benzylamine; and alkanol amines; e.g., 2-aminoethanol and 1-aminopropan-2-ol. Preferred primary amines are aniline, 4-methoxyaniline, 4-tert-butylaniline, butylamine, and 2-aminoethanol. The most preferred primary amine is 2-aminoethanol.

The bis-secondary amines which can be employed in the practice of the present invention to prepare the polymers include piperazine and substituted piperazines, e.g., dimethylpiperazine and 2-methylamidopiperazine; bis(N-methylamino)benzene, 1,2-bis(N-methylamino)ethane, and N,N'-bis(2-hydroxyethyl)ethylenediamine. Preferred bis-secondary amines are piperazine, dimethylpiperazine, and 1,2-bis(N-methylamino)ethane. The most preferred bis-secondary amine is piperazine.

The amine-functionalized poly(alkylene oxides) which can be employed in the practice of the present invention to prepare the polymers include those materials represented by the general formula:

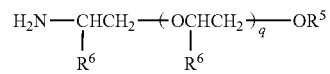

wherein $R^6$ is hydrogen, methyl, ethyl, hydrocarbyl or mixtures thereof; $R_5$ is hydrocarbyl and q is from about 1 to about 1000. Typical of amines of this class are the "M" series Jeffamine™ products manufactured by Huntsman. They are typically prepared by polymerizing ethylene oxide, propylene oxide, butylene oxide, and the like or mixtures thereof with aliphatic alcohol initiators and then subsequently converting the resulting terminal hydroxyl group to an amine moiety.

Epoxy-functionalized poly(alkylene oxides) can be employed also in the practice of the present invention to prepare the polymers, and they can be mixed with diglycidyl ethers of bisphenols. Suitable epoxy-functionalized poly (alkylene oxides) are those represented by the general formula:

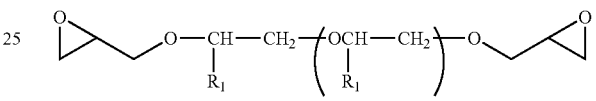

wherein $R_1$ is hydrogen, methyl, or mixtures thereof; and y is from about 1 to about 40. Typical of epoxides of this class are the "700" series D.E.R.™ epoxy resins manufactured by The Dow Chemical Company. They are synthesized by polymerizing ethylene oxide, propylene oxide, or mixtures thereof with hydroxide initiators and then reacting the resulting poly(alkylene oxide) diol with epichlorohydrin.

The diglycidyl ethers which can be employed in the practice of the present invention for preparing the polymers include 9,9-bis(4-hydroxyphenyl)fluorene, 4,4'-methylene bisphenol (bisphenol F), hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenol, 4,4'-dihydroxybiphenylene oxide, bis(4-hydroxyphenyl) methane, .alpha.,.alpha.-bis(4-hydroxyphenyl)ethylbenzene, 2,6-dihydroxynaphthalene and 4,4'-isopropylidene bisphenol (bisphenol A) and the diglycidyl ethers of the amide-containing bisphenols such as N,N'-bis(hydroxyphenyl)alkylenedicarboxamides, N,N'-bis(hydroxyphenyl)arylenedicarboxamides, bis(hydroxybenzamido)alkanes or bis (hydroxybenzamido)arenes, N-(hydroxyphenyl) hydroxybenzamides, 2,2-bis(hydroxyphenyl)acetamides, N,N'-bis(3-hydroxyphenyl)glutaramide, N,N'-bis(3-hydroxyphenyl) adipamide, 1,2-bis(4-hydroxybenzamido)ethane, 1,3-bis(4-hydroxybenzamide)benzene, N-(4-hydroxyphenyl)-4-hydroxybenzamide, and 2,2-bis(4-hydroxyphenyl)-acetamide. The more preferred diglycidyl ethers are the diglycidyl ethers of 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, bisphenol F, tetrabromoisopropylidenebisphenol, dihydroxy dinitrofluorenylidenediphenylene, 4,4'-biphenol, 4,4'-dihydroxybiphenylene oxide, bis(4-hydroxyphenyl)methane, .alpha.,.alpha.-bis(4-hydroxyphenyl)ethyl-benzene, 2,6-dihydroxynaphthalene and 4,4'-isopropylidene bisphenol (bisphenol A). The most preferred diglycidyl ethers are the diglycidyl ethers of 4,4'-isopropylidene bisphenol (bisphenol A), 4,4'-sulfonyldiphenol, 4,4'-oxydiphenol, 4,4'-dihydroxybenzophenone, 9,9-bis(4-hydroxy-phenyl)fluorene and bisphenol F.

The monofunctional nucleophiles which function as terminating agents which can be employed in the practice of the present invention include secondary amines, hydrogen sulfide, ammonia, ammonium hydroxide, a hydroxyarene, an aryloxide salt, a carboxylic acid, a carboxylic acid salt, a mercaptan or a thiolate salt. Preferably, the hydroxyarene is phenol, cresol, methoxyphenol, or 4-tert-butylphenol; the aryloxide salt is sodium or potassium phenate; the carboxylic acid is acetic acid or benzoic acid; the carboxylic acid salt is sodium acetate, sodium benzoate, sodium ethylhexanoate, potassium acetate, potassium benzoate, potassium ethylhexanoate, or calcium ethylhexanoate; the mercaptan is 3-mercapto-1,2-propanediol or benzenethiol; and the thiolate salt is sodium or potassium benzenethiolate.

Preferred catalysts include metal hydroxides, quaternary ammonium salts or quaternary phosphonium salts. Especially preferred catalysts include sodium hydroxide, potassium hydroxide, ammonium hydroxide, ethyltriphenylphosphonium acetate, tetrabutylammonium bromide and bis(triphenylphosphoranylidene)ammonium chloride.

The conditions at which the reaction is most advantageously conducted are dependent on a variety of factors, including the specific reactants, solvent, and catalyst employed but, in general, the reaction is conducted under a non-oxidizing atmosphere such as a blanket of nitrogen, preferably at a temperature from about 40° C. to about 190° C., more preferably at a temperature from about 50° C. to about 150° C. The reaction can be conducted neat (without solvent or other diluents). However in some cases, in order to ensure homogeneous reaction mixtures at such temperatures, it can be desirable to use inert organic solvents or water as solvent for the reactants. Examples of suitable solvents include dipropylene glycol methyl ether, available commercially as Dowanol™ DPM, a product of The Dow Chemical Company, and the ethers or hydroxy ethers such as diglyme, triglyme, diethylene glycol ethyl ether, diethylene glycol methyl ether, dipropylene glycol methyl ether, propylene glycol phenyl ether, propylene glycol methyl ether and tripropylene glycol methyl ether as well as aprotic amide solvents like 1-methyl-2-pyrrolidinone, N,N-dimethylacetamide, and mixtures thereof.

It is most preferred that the polyalkylene oxide chain be rich in ethylene oxide relative to propylene oxide. The length of the polyalkylene side-chain can be from 1 alkylene oxide units to 1000 alkylene oxide units, preferably from 2 alkylene oxide units to 500 alkylene oxide units, more preferably from 5 alkylene oxide units to 250 alkylene oxide units and, most preferably, from 10 alkylene oxide units to 100 alkylene oxide units.

Preferably, the copolyhydroxyaminoether has a molecular weight of from about 1000 to about 500,000, more preferably from about 2000 to about 250,000 and, most preferably, from about 5000 to about 100,000. The copolymer molecular weight can be controlled by either off-stoichiometry of the N—H to epoxy ratio or by introduction of monofunctional terminating agents, described previously, at the start of the polymerization process or added during or at the end of the polymerization process.

Advantageously, the polyalkylene oxide containing polymer repeat units is used in an amount of from about 1 to about 99 mole %, more preferably, in an amount of from about 1 to about 25 mole %.

Preferably, the copolyhydroxyaminoethers have glass transition temperatures of from about (−)60° C. to about 150° C.

Aqueous solutions of copolyhydroxyaminoethers can exhibit a cloud point or lower critical solution temperature (LCST), such that an aqueous solution of copolyhydroxyaminoethers flow at some temperature below the boiling point of water, preferably room temperature, and becomes more viscous and/or gels with the possible optical transition from clear-to-hazy/opaque/turbid at more elevated temperatures. The term cloud point is a term that can be used to describe the optical transition. As used herein, the term "LCST" describes the temperature at which the polymer solution experiences a phase transition going from one phase (homogeneous solution) to at least a two-phase system (a polymer rich phase and a more solvent rich phase) as the solution temperature increases. The cloud point or LCST can be changed by the addition of salts, acids, or bases to the aqueous solutions of polyhydroxyaminoethers. The cloud point or LCST can also be changed as a function of concentration of polyhydroxyaminoether in aqueous solutions as well as the molecular weight of the polyhydroxyaminoether.

The following working examples are given to illustrate the invention and should not be construed as limiting its scope. Unless otherwise indicated, all parts and percentages are by weight.

The following materials are used in the Examples:

D.E.R.™ 332 A high purity bisphenol A diglycidyl ether manufactured by THE DOW CHEMICAL COMPANY.

JEFFAMINE™ XTJ506 A polyoxyalkylenemonoamine with a propylene oxide/ethylene oxide ratio of ~3/19 and a molecular weight of ~1000 manufactured by Huntsman.

JEFFAMINE™ M2070 A polyoxyalkylenemonoamine with a propylene oxide/ethylene oxide ratio of ~10/32 and a molecular weight of ~2000 and manufactured by Huntsman.

EXAMPLE 1

Solution, D.E.R. 332/MEA/Jeffamine XTJ506, 100/80/20 (m/m/m), DP~15, hydroxyethylpiperazine)

Into a 1 L resin kettle is loaded D.E.R. 332 (180.00 grams, EEW 171), JEFFAMINE XTJ 506 (101.75 grams, Mn~1030), ethanolamine (24.10 grams), 1-(2-hydroxethyl)piperazine (8.60 grams), and N,N-dimethylacetamide, anhydrous (250 mL). Stirred reaction mixture under positive nitrogen is initially warmed to ~45° C. When initial exotherm subsides, reaction setpoint is raised to 75° C. and after temperature rise stabilizes, setpoint is raised to 140° C. and held at that temperature for ~1 hour. Reaction mixture is cooled with N,N-dimethylacetamide subsequently removed under vacuum at ~95° C. Product has an inherent viscosity of 0.18 dL/g (N,N-dimethylformamide, 30.0° C., 0.5 g/dL). Half-height glass transition by DSC at 10° C./min heating rate is 6° C. A 20 wt % solution of the product in water is prepared that is of low viscosity and essentially clear at room temperature; at ~50° C. the solution becomes translucent/opaque white and a soft-gel of high viscosity; when solution is cooled to room temperature it once again becomes of low viscosity and essentially clear.

EXAMPLE 2

Solution, D.E.R. 332/MEA/Jeffamine XTJ506, 100/85/15 (m/m/m), DP~25, hydroxyethylpiperazine Into a 1 L resin kettle is loaded D.E.R. 332 (76.00 grams, EEW 171), JEFFAMINE XTJ 506 (35.59 grams, Mn~1031), ethanolamine (10.93 grams), 1-(2-hydroxethyl)piperazine (2.28 grams), and N,N-dimethylacetamide, anhydrous (150 mL). Stirred reaction mixture under positive nitrogen is initially warmed to ~45° C. When initial exotherm subsides, reaction setpoint is raised to 75° C. and after temperature rise stabilizes, setpoint is raised to 100° C. for less than ½ hour, setpoint raised to 140° C. and held at that temperature for ~1.25 hour. Reaction mixture is cooled with N,N-dimethylacetamide subsequently removed under vacuum at ~95° C. Product has an inherent viscosity of 0.23 dL/g (N,N-dimethylformamide, 30.0° C., 0.5 g/dL). Half-height glass transition by DSC at 10° C./min heating rate is 13° C. A 15 wt % solution of the product in water is prepared at room temperature that at ~50° C. becomes a translucent, white gel.

EXAMPLE 3

Solution, D.E.R. 332/MEA/Jeffamine XTJ506, 100/85/15 (m/m/m)

Into a 100 mL resin kettle is loaded D.E.R. 332 (12.000 grams, EEW 171), Jeffamine XTJ 506 (5.426 grams, Mn ~1031), ethanolamine (1.822 grams), and N,N-dimethylacetamide, anhydrous (25 mL). Stirred reaction mixture under positive nitrogen is initially warmed to ~45° C. When initial exotherm subsides, reaction setpoint is raised to 75° C. and after temperature rise stabilizes, setpoint is raised to 100° C. for less than ¾ hour, setpoint raised to 140° C. and held at that temperature for ~3.25 hour. Reaction mixture is held at 100° C. overnight. Ethanolamine (0.026 g) in N,N-dimethylacetamide (2 mL) is added to kettle and after 30 minutes at 100° C., temperature is raised to 140° C. for ~2 hours with subsequent cooling. N,N-dimethylacetamide is subsequently removed under vacuum at ~95° C. Product has an inherent viscosity of 0.33 dL/g (N,N-dimethylformamide, 30.0° C., 0.5 g/dL). Half-height glass transition by DSC at 10° C./min heating rate is 16° C. No terminator is used in the reaction. A 20 wt % solution of the product in water is prepared.

EXAMPLE 4

Solution, D.E.R. 332/MEA/Jeffamine XTJ506, 100/88.75/11.25 (m/m/m)

Into a 100 mL resin kettle is loaded D.E.R. 332 (13.000 grams, EEW 171), Jeffamine XTJ 506 (4.409 grams, Mn ~1031), ethanolamine (2.061 grams), and N,N-dimethylacetamide, anhydrous (25 mL). Stirred reaction mixture under positive nitrogen is initially warmed to ~45° C. When initial exotherm subsides, reaction setpoint is raised to 75° C. and after temperature rise stabilizes, setpoint is raised to 100° C. for less than ~½ hour, setpoint raised to 140° C. and held at that temperature for ~3 hour. Reaction mixture is held at 100° C. overnight. Ethanolamine (0.022 g) in N,N-dimethylacetamide (2 mL) is added to kettle and temperature is raised to 140° C. for ~1.5 hours. Product is precipitated in ice-water, water washed, and dried at ~55° C. in a vacuum oven. Product has an inherent viscosity of 0.34 dL/g (N,N-dimethylformamide, 30.0° C., 0.5 g/dL). Half-height glass transition by DSC at 10° C./min heating rate is 31° C. No terminator is used in the reaction. The polymer produced is not water soluble.

EXAMPLE 5

Solution, D.E.R. 332/MEA/Jeffamine XTJ506, 100/92.5/7.5 (m/m/m))

Into a 100 mL resin kettle is loaded D.E.R. 332 (14.000 grams, EEW 171), Jeffamine XTJ 506 (3.165 grams, Mn~1031), ethanolamine (2.313 grams), and N,N-dimethylacetamide, anhydrous (25 mL). Stirred reaction mixture under positive nitrogen is initially warmed to ~45° C. When initial exotherm subsides, reaction setpoint is raised to 75° C. and after temperature rise stabilizes, setpoint is raised to 100° C. for ~1 hour, setpoint raised to 140° C. and held at that temperature for ~3.25 hour. Reaction mixture is held at 100° C. overnight. Ethanolamine (0.022 g) in N,N-dimethylacetamide (2 mL) is added to kettle and temperature is raised to 140° C. for ~1 hours with subsequent addition of N,N-dimethylacetamide (10 mL) and cooling. Product is precipitated in ice water, water washed, and dried under vacuum at ~55° C. Product has an inherent viscosity of 0.46 dL/g (N,N-dimethylformamide, 30.0° C., 0.5 g/dL). Half-height glass transition by DSC at 10° C./min heating rate is 46° C. No terminator is used in the reaction. The polymer produced is not water soluble.

EXAMPLE 6

MELT, D.E.R. 332/MEA/Jeffamine XTJ506 100/80/20 (m/m/m) DP ~15, hydroxyethylpiperazine Into a 1 L resin kettle is loaded D.E.R. 332 (345.15 g, EEW 172.7), Jeffamine XTJ 506 (189.24 g, Mn~1010), ethanolamine (45.78 g), and 1-(2-hydroxyethyl)piperazine (16.27 g).

Initial setpoint for the stirred reaction is 45° C. under positive $N_2$. Reaction mixture starts self-heating with cooling applied with temperature kept below ~140-150° C. After temperature rise subsides, reaction is kept at 140° C. for 30 minutes with product then cooled to room temperature. Product has an inherent viscosity of 0.19 dL/g (N,N-dimethylformamide, 30.0° C., 0.5 g/dL). Half-height glass transition by DSC at 10° C./min heating rate is 6° C. An aqueous solution of product is prepared by adding 312.5 grams in portions to a stirred 2 L resin kettle containing water (1193.1 g) and acetic acid (1.37 g) at ~40° C. Aqueous sodium hydroxide (45.5 mL, 0.50 N) is subsequently added to the solution with a 10 mL water rinse.

EXAMPLE 7

Melt, D.E.R. 332/MEA/Jeffamine M2070 100/87.5/12.5 (m/m/m) DP ~13.7, diethanolamine Into a 1 L resin kettle is loaded D.E.R. 332 (317.97 g, EEW 172.7), JEFFAMINE M2070 (223.39 g, Mn~2083), ethanolamine (45.86 g), and diethanolamine (13.15 g). Initial setpoint for the stirred reaction is 45° C. under positive $N_2$. Reaction mixture starts self-heating with cooling applied with temperature kept below ~140-150° C. After temperature rise subsides, reaction is kept at 140° C. for 30 minutes with product then cooled to room temperature. Product has an inherent viscosity of 0.17 dL/g (N,N-dimethylformamide, 30.0° C., 0.5 g/dL). Half-height glass transition by DSC at 10° C./min heating rate is 2° C. An aqueous solution of product is prepared by adding 312.5 grams in portions to a stirred 2 L resin kettle containing water (1193.1 g) and acetic acid (1.37 g) at ~40° C. Aqueous sodium hydroxide (45.5 mL, 0.50 N) is subsequently added to the solution with a 10 mL water rinse.

EXAMPLE 8

Solution, D.E.R. 332/MEA/Jeffamine M2070, 100/85/15 (M/M/M)

Into a 100 mL resin kettle is loaded D.E.R. 332 (10.000 grams, EEW 171), JEFFAMINE M2070 (8.932 grams, Mn~2083), ethanolamine (1.484 grams), and N-methylpyrrolidinone, anhydrous (20 mL). Stirred reaction mixture under positive nitrogen is initially warmed to ~45° C. When initial exotherm subsides, reaction setpoint is raised to 75° C. and after temperature rise stabilizes, setpoint is raised to 100° C. for ~2 hours, setpoint raised to 140° C. and held at that temperature for ~3.25 hour. Reaction mixture is held at 100° C. overnight. Ethanolamine (0.026 g) in N,N-dimethylacetamide (2 mL) is added to kettle and after 30 minutes at 100° C., temperature is raised to 140° C. for ~3.75 hours with subsequent cooling to 100° C. overnight. Ethanolamine (0.017 g) in 2 mL N-methylpyrrolidinone is added to kettle with temperature raised to 140° C. for ~4.25 hours and cooled. Product does not precipitate in water. Product precipitate in cold isopropanol and is washed with cold and ambient isopropanol with product dried at ~110° C. under vacuum. Product has an inherent viscosity of 0.75 dL/g (N,N-dimethylformamide, 30.0° C., 0.5 g/dL). Half-height glass transition by DSC at 10° C./min heating rate is −15° C. No terminator is used in the reaction.

EXAMPLE 9

Water Polymerization, D.E.R. 332/MEA/Jeffamine M-2070 and DEA

Into a 30 gal stainless steel reactor is loaded 8137.5 g water and mixing started at 100 RPM's. JEFFAMINE M-2070 (6437.1 g, Mn ~1040), ethanolamine (1321.5 g) and diethanolamine (378.9 g) are added then heated to 54-63° C. temperature. Pressure was 19.1-21.7 PSIA and mixing increased to 200 RPM's. D.E.R. 332 (9084 g, EEW 172.7) was added over a time period of 1 hour and 48 minutes via a 2 gal stainless steel (SS 316) charge pot. The reaction mixture was digested for 34 minutes and then water (133.8 lbs) was added over a 31 minute time. The resulting solution was mixed for 1 hr and 39 minutes then cooled to 25° C. and filtered via a 25 micro Nomex bag filter system into polyethylene containers.

EXAMPLE 10

Dowanol PM Polymerization, D.E.R. 332/MEA/Jeffamine M-2070 and DEA

Into a 30 gal stainless steel (SS 316) reactor is loaded 8137.5 g of Dowanol PM and mixing started at 100 RPM's. JEFFAMINE M-2070 (6437.1 g, Mn ~1040), ethanolamine (1321.5 g) and diethanolamine (378.9 g) are added then heated to 87-91.6° C. temperature. Pressure was 19.1-21.7 PSIA and mixing increased to 200 RPM's. D.E.R 332 (9082 g, EEW 172.7) was added over a time period of 1 hour and 34 minutes via a 2 gal stainless steel charge pot. The reaction mixture was digested for 2 hr and 43 minutes at a temperature of 89-101° C. and then water (133.7 lbs) was added over a 36 minute time. The resulting solution was mixed for 1 hr at 67.1-89° C. and 150 RPM's then cooled to 26° C. and filtered via a 25 micro Nomex bag filter system into polyethylene containers.

What is claimed is:

1. A water-soluble co-polyhydroxyaminoether having side chains of polyalkylene oxides; wherein the water-soluble polymer is represented by the formula:

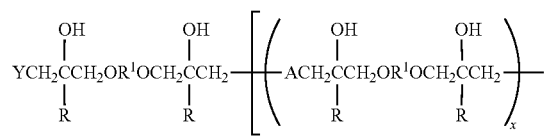

-continued

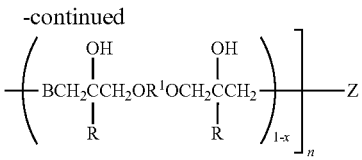

wherein: R is independently selected from hydrogen and $C_1$-$C_{20}$ alkyl; $R^1$ is individually selected from an aromatic moiety and a substituted aromatic moiety; Y is an organic moiety that does not contain an epoxy group; Z is an organic moiety optionally containing an epoxy group; n is 5-400; x is about 0.01 to about 0.99; A is individually selected from an amino group represented by one of the following formulas:

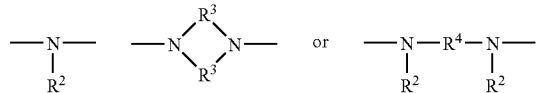

wherein: $R^2$ is independently selected from hydrocarbyl and substituted hydrocarbyl; $R^3$ is independently selected from $C_2$-$C_{10}$ hydrocarbylene or substituted hydrocarbylene; $R^4$ is independently selected from $C_2$-$C_{20}$ hydrocarbylene and substituted hydrocarbylene; and the substituent(s) is independently selected from the group consisting of hydroxyl, cyano, halo, aryloxy, alkylamido, arylamido, alkycarbonyl, or arylcarbonyl; and B is represented by the formula:

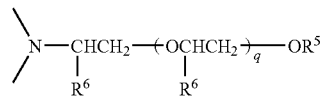

wherein: $R^5$ is methyl; $R^6$ is independently selected from the group consisting of hydrogen and methyl; the molar ratio of propylene oxide to ethylene oxide is approximately 3/19 or approximately 10/32; and q is a number yielding an approximate molecular weight of 1000 or 2000.

2. An aqueous solution comprising water and the water-soluble co-polyhydroxyaminoether according to claim 1.

3. The aqueous solution according to claim 2, wherein a viscosity of the solution increases as temperature is increased.

4. The water-soluble co-polyhydroxyaminoether according to claim 1, wherein: R is hydrogen; $R^1$ is independently selected from the group consisting of isopropylidenediphenylene, 1,4-phenylene, 1,3-phenylene, methylenediphenylene, thiodiphenylene, and carbonyldiphenylene; $R^2$ is independently selected from the group consisting of methyl, ethyl, phenyl, benzyl, 2-hydroxyethyl, 3-hydroxypropyl, 2-hydroxypropyl, 2,3-dihydroxypropyl, 2-(acetamido)ethyl; and $R^3$ and $R^4$ are independently selected from the group consisting of ethylene, 1,2-propylene, 1,2-butylene.

5. An aqueous solution comprising water and the water-soluble co-polyhydroxyaminoether according to claim 4.

6. The aqueous solution according to claim 5, wherein a viscosity of the solution increases as temperature is increased.

7. The water-soluble co-polyhydroxyaminoether according to claim 4, wherein: $R^1$ is isopropylidenediphenylene; $R^2$ is 2-hydroxyethyl; Y is N-(2-hydroxyethyl)piperazinyl or bis (2-hydroxyethyl)amino; Z is N-(2-hydroxyethyl)piperazinyl or bis(2-hydroxyethyl)amino, and n is 10-25.

8. An aqueous solution comprising water and the water-soluble co-polyhydroxyaminoether according to claim 7.

9. The aqueous solution according to claim 8, wherein a viscosity of the solution increases as temperature is increased.

* * * * *